United States Patent [19]

Smith

[11] Patent Number: 5,504,180
[45] Date of Patent: * Apr. 2, 1996

[54] PROCESS FOR THE PREPARATION OF POLYURETHANE ARTICLES FROM URETONIMINE BASED COMPOSITIONS

[75] Inventor: Stuart B. Smith, Conyers, Ga.

[73] Assignee: ECP Enichem Polimeri Netherlands, B.V., Amsterdam, Netherlands

[*] Notice: The portion of the term of this patent subsequent to May 23, 2012, has been disclaimed.

[21] Appl. No.: 160,780

[22] Filed: Dec. 3, 1993

Related U.S. Application Data

[63] Continuation-in-part of Ser. No. 130,745, Oct. 4, 1993, abandoned.

[51] Int. Cl.$^6$ .......................... C08G 18/48; C08G 18/76; C08G 18/79; C08G 18/12
[52] U.S. Cl. .......................... 528/60; 528/64; 528/66; 528/67; 528/55; 528/52; 528/53; 528/73; 264/328.1; 264/328.6
[58] Field of Search ...................... 528/60, 64, 66, 528/67, 55, 52, 53, 73; 264/328.1, 328.6

[56] References Cited

U.S. PATENT DOCUMENTS

| | | | |
|---|---|---|---|
| 4,284,730 | 8/1981 | Narayan et al. | 528/67 |
| 4,559,366 | 12/1985 | Hostettler | 528/60 |
| 5,059,634 | 10/1991 | Smith | 521/167 |
| 5,202,358 | 4/1993 | Scholl et al. | 528/67 |
| 5,216,035 | 6/1993 | Harrison et al. | 521/51 |
| 5,236,960 | 8/1993 | Harrison et al. | 521/51 |
| 5,338,820 | 8/1994 | Harrison et al. | 528/67 |
| 5,418,260 | 5/1995 | Smith | 521/159 |
| 5,422,414 | 6/1995 | Smith | 528/60 |

OTHER PUBLICATIONS

Buist, Editor: *Developments in Polyurethane–1*; Applied Science Publishers Ltd.; London; 1978; pp. 86–87.

Primary Examiner—James J. Seidleck
Assistant Examiner—Rabon Sergent
Attorney, Agent, or Firm—Oblon, Spivak, McClelland, Maier & Neustadt

[57] ABSTRACT

This invention relates to a process for the preparation of polyurethane articles from uretonimine based compositions.

17 Claims, No Drawings

PROCESS FOR THE PREPARATION OF POLYURETHANE ARTICLES FROM URETONIMINE BASED COMPOSITIONS

This application is a Continuation-In-Part Application of U.S. Ser. No. 08/130,745 filed on Oct. 4, 1993, abandoned.

BACKGROUND OF THE INVENTION

1. Field of the Invention

This invention relates to a process for the preparation of polyurethane articles from uretonimine based compositions, a polyurethane composition and molded articles obtained thereby by RIM and spray molding.

2. Discussion of the Background

Polyurethane polymers prepared from an active hydrogen-containing compound and an isocyanate are widely employed in molding processes, particularly reaction injection molding (hereinafter RIM) processes. RIM articles are finding increased usage as automotive fascia.

The basic polyurethane polymer systems are typically based on an OH polyol component, an OH cross-linker and an isocyanate component. However this system suffers from long cream, demolding and cycle times, greatly increasing the processing time. Modifications to the basic polyurethane system to shorten these processing times has been achieved through substitution of the OH cross-linker with an aminic cross-linking system. Typically, thermosetting urethane polymer compositions comprise an isocyanate component with an excess of isocyanate groups and an aromatic diamine as a chain extender, to form a polyurea-type urethane polymer. Optionally, the polymer composition may also contain additional amounts of a reactive polyol to form a hybrid urea-urethane polymer. Such systems greatly decrease the cream and demolding times, therefore enabling much shorter cycling times in a RIM process.

The use of chain extenders, such as di-alkyl aromatic diamines, and more particularly di-ethyltoluene diamines and di(alkylthio)aromatic diamines are often used with isocyanate pre-polymers alone or with a polyol component to form a hybrid polyurea/polyurethane molding RIM composition (for example U.S. Pat. Nos. 4,595,742, 4,631,298, and 4,786,656). While an increase in the flexural modulus is observed through the addition of di-alkyl(thio)aromatic diamines, these compositions are still limited with respect to flexural modulus without observing "cold break" on demolding. "Cold Break" is a brittleness observed in the molded article during demolding. The presence of cold break causes the molded article to fracture on demolding. When trying to achieve a higher flexural modulus, to above 80,000 psi, by increasing the isocyanate content of the isocyanate component (i.e. higher % NCO), these materials suffer "cold break". Alternatively attempts to increase the flexural modulus by increasing the functionality of the polyol component also suffers from "cold break". Accordingly, efforts to increase the flexural modulus while preventing "cold break" is an on going area of research.

In addition to the mechanical properties of the polyurethane polymer, the processing of the polymer systems plays an important role in the usefulness of a polyurethane system. In RIM processing, a short gel time is desired to increase the productivity of the overall process. However, polyurethane systems based on an OH polyol component, an OH cross-linker and an isocyanate component had a gel time of from 5–8 seconds and a cycle time of from 3–3.5 min. Polyurethane systems using —NH$_2$ crosslinkers and —OH polyols (for example U.S. Pat. Nos. 4,595,742, 4,631,298, and 4,786,656) reduced the gel time to about 1.2 seconds and the cycle time to 1.5–2 min. This greatly increased the productivity of RIM processes using these systems, but these —NH$_2$ crosslinkers and —OH polyols systems suffered from an inability to increase the flexural modulus above 80,000 psi without observing "cold break" without the addition of fillers.

Polyurea systems based on amine terminated polyether resins and aminic cross-linkers have been developed (U.S. Pat. Nos. 4,433,067 and 4,444,910), which afford superior heat resistance and mechanical properties, and due to the extremely high reactivity of the amine terminated polyether resin, the gel times are extremely short, in the range of 0.7 seconds. Such a rapid reaction rate makes these systems very difficult to manipulate, and also severely limits the type of RIM technique for which such a composition is suitable. For example, Structural Reaction Injection Molding (S-RIM) is not applicable to such a system due to the short reaction time, resulting in incomplete wetting of the structural reinforcement.

It has also been discovered that the flexural modulus of a polyurethane composition based on MDI-polyol pre-polymer and an aromatic diamine can be increased beyond 80,000 psi at 75° F. while being substantially free of "cold break" by the addition of a "cold break" additive such as triethanol amine or a triethanol amine-ethylene oxide end capped reaction product (U.S. Pat. No. 5,059,634). However the mechanical properties and processability of the "cold break" containing polyurethane compositions can still be improved.

The polyether polyol component in a polyurethane system is typically based on ethylene oxide or propylene oxide or a mixture of the two. Block copolymers may be manufactured by first reacting propylene glycol with propylene oxide to form a homopolymer followed by reaction with ethylene oxide to give a block copolymer. Since the primary hydroxyl groups resulting from ethylene oxide are more reactive than secondary hydroxyl groups, the polyols produced in this manner are more reactive. In this fashion "EO capped" polyether polyols are produced. Random copolymers are obtained by polymerizing mixtures of propylene oxide and ethylene oxide.

Consequently, research continues into methods for forming polyurethane articles with excellent mechanical properties, but more flexible gel times and the elimination of "cold break" in the product.

SUMMARY OF THE INVENTION

Accordingly, one object of this invention is to provide a process for the preparation of polyurethane articles from uretonimine based compositions.

The object of the present invention is provided for by a reaction injection molding process comprising reaction injection molding:

A) an isocyanate quasi pre-polymer component comprising the reaction product of:
  i) a uretonimine modified MDI having a free isocyanate content of from 20–30% by weight NCO; and
  ii) a polyether triol component obtained from the reaction of a triol starter with a mixture of ethylene oxide and propylene oxide, containing 10–85% by weight of ethylene oxide and having a number average molecular weight of from 400–6,000;

wherein said isocyanate quasi pre-polymer has a free isocyanate content of from 10–27% by weight NCO; and
B) a polyol component comprising:
  i) 25–250 pbw of a polyether polyol component of functionality 2–3 based on ethylene oxide units and propylene oxide units and a number average molecular weight of 4,000–6,000;
  ii) 25 pbw of an aromatic diamine; and
  iii) 0–50 pbw of an aminic polyol;
  iv) 0.01–0.5 pbw of an organometallic urethane forming catalyst; and
  v) 0–5.0 pbw of an amine urethane forming catalyst.

The inventor has discovered that such an isocyanate quasi pre-polymer made from a polyether triol component and uretonimine modified MDI allows for a reaction injection molding process for polyurethane articles with improved processability in terms of gel times (longer gel times) and demolding times (shorter demolding times), improved thermal resistance in HDT and SAG tests and improved impact resistance at high flexural modulus with no cold break.

DETAILED DESCRIPTION OF THE PREFERRED EMBODIMENTS

The isocyanate quasi pre-polymer used in the present process is the reaction product of a uretonimine modified MDI with a polyether triol component. It has a final free NCO content of 10–27% by weight, more particularly 14–22% by weight. The isocyanate quasi pre-polymer preferably has an isocyanate equivalent weight of 420–168 and a viscosity of 1,000–150 centipoise at 75° F.

The isocyanate quasi pre-polymer is prepared by reacting 1 part of the polyether triol component with from 1–6 part of the uretonimine modified MDI at a temperature of from room temperature (72° F.) to 300° F., more preferably 120°–150° F., for a period of 2–3 hours.

The polyether triol component is a polyether triol based on a triol starter such as glycerine. The polyether triol has an ethylene oxide (EO) content of from 10–85 wt. % and a propylene oxide (PO) content of from 15–90 wt. %. More preferably, the EO content is 65–85 wt. % and the PO content is 15–35 wt. %, most preferably a triol having 70 wt. % EO and 30 wt. % PO is suggested.

The polyether triol has a number average molecular weight $M_n$ of 400–6,000, preferably 2,000–5,000, more preferably 4,800. However the triol component should be a liquid at the processing temperatures for RIM of about 80°–100° F., preferably 90° F.

The polyether triol component can be either a random heteropolymer of polyethylene oxide and polypropylene oxide units or end capped with ethylene oxide.

The polyether triol component has a hydroxyl number of from 28–38, more preferably 35.

Preferably the polyether triol is a random PO/EO copolymer with a number average molecular weight of 400–6,000.

Also preferred is a polyether triol which is PO extended and EO capped with a number average molecular weight of 2,000–6,000.

Also preferred is a polyether triol with a random PO/EO distribution and EO capped with a number average molecular weight of 2,000–6,000.

A suitable material is sold commercially as POLY-G 83-34 (a trademark of Olin Chemicals).

The polyether triol component may be made by conventional methods known to those of ordinary skill in the art. More specifically, polyether triols can be made by the reaction of ethylene oxide and/or propylene oxide with a triol, with the aid of a catalyst such as potassium or sodium hydroxide. A suitable method is described in *Kirk-Othmer Encyclopedia Of Chemical Technology*, 3rd. Ed., vol 18, p638+.

The uretonimine modified MDI has a free isocyanate content of 20–30% by weight NCO, more preferably 27–29% by weight NCO. The uretonimine modified MDI preferably has a viscosity of 40 cps at 20° C.

Examples of commercial materials of this type are ISONATE 143L (by Upjohn Co.-Dow), RUBINATE LF-168 (by ICI), and Tedimon-316 (by EniChem).

The Component B used in this process comprises:
  i) 25–250 pbw of a polyether polyol component of functionality 2–3 based on ethylene oxide units and propylene oxide units and a number average molecular weight of 4,000–6,000;
  ii) 25 pbw of an aromatic diamine; and
  iii) 0–50 pbw of an aminic polyol;
  iv) 0.01–0.5 pbw of an organometallic urethane forming catalyst; and
  v) 0–5.0 pbw of an amine urethane forming catalyst.

The polyether polyol component (B(i)) is a conventional polyether polyol based on a di- or triol such as ethylene glycol or glycerine, having an ethylene oxide content lower than 30% b.w.

The polyether polyol has a number average molecular weight $M_n$ of 4,000–6,000. However the polyether polyol component should be a liquid at the processing temperatures for RIM of about 80°–100° F., preferably 90° F.

The polyether polyol component can be either a random heteropolymer of polyethylene oxide and polypropylene oxide units or end capped with ethylene oxide.

The polyether polyol component may be made by conventional methods known to those of ordinary skill in the art. A suitable method is described in *Kirk-Othmer Encyclopedia of Chemical Technology*, 3rd. Ed., vol p638+.

As the aromatic diamine component, are diethyltoluene diamine or DETDA which is commercially available as a product of the Ethyl Corporation (ETHACURE® 100) and comprises a mixture of positional isomers having about 76% 1-methyl-3,5-diethyl-2,4-diaminobenzene and about 24% 1-methyl-3,5-diethyl-2,6-diaminobenzene. Also suitable as the aromatic diamine component is dimethylthiotoluenediamines such as 1-methyl,-3,5-dimethylthio-2,4-diaminobenzene and 1-methyl-3,5-dimethylthio-2,6-diaminobenzene available from the Ethyl Corporation as (ETHACURE® 300).

The aromatic diamine component may be made by conventional means known to those of ordinary skill in the art. The synthesis of 1-methyl,-3,5-dimethylthio-2,4-diaminobenzene is described in U.S. Pat. No. 4,595,742.

As the aminic polyol component, are triethanolamine or $C_2$–$C_3$ alkyleneoxide adducts of triethanolamine, diethanolamine, ethylenediamine, toluenediamine, etc. A triethanolamine end capped ethylene oxide or propylene oxide adduct of molecular weight ranging from 600–1,000 or more is preferred. Also suitable are aromatic diamines such as toluenediamine which are both ethoxylated or propoxylated, as well as ethylene diamine polyols such as ethylene diamine ethoxylated or propoxylated or both polyols. The aminic polyol component may also be used as a mixture of the above-identified materials. An aminic polyol with 10–20 % by weight of ethylene oxide units and 80–90 % by weight of propylene oxide units is preferred. Especially suitable is a mixture of toluenediamine of OH # 340 and ethylene diamine propoxylated polyol.

The aminic polyol component may be made by conventional means known to those of ordinary skill in the art in a manner analogous to the synthesis of hydroxy based polyether polyols.

As the organometallic catalyst component are urethane forming catalysts which are known to those of ordinary skill in the art.

As the amine catalysts, are tertiary amine urethane forming catalysts which are known to those of ordinary skill in the art.

Organometallic and amine catalysts are disclosed in Saunders and Frisch "Polyurethanes, Chemistry and Technology", Interscience, New York, 1964.

The polyether polyol, aromatic diamine, aminic polyol, organometallic catalyst and amine catalyst components form the B component of the polyurethane system. The system contains from 25–250 pbw of the polyether polyol, more preferably 25–100; 25 pbw of the aromatic diamine component; 0–50 pbw of the aminic polyol component, 0.01–0.5 pbw, preferably 0.01–0.2 pbw of an organometallic urethane forming catalyst and 0–5.0 pbw, preferably 0–2.0 pbw of an amine urethane forming catalyst, wherein pbw is based on 25 pbw of the aromatic diamine component.

The reactants which form the B component are mixed with the isocyanate quasi pre-polymer at a 102 index or greater. A 102 index is known to those of ordinary skill in the art as meaning that at least 1.02 equivalents of isocyanate groups in the isocyanate quasi pre-polymer A are reacted per equivalent of active hydrogen containing component based on the B components. Preferably the index is in the range of 102–110, more preferably 105.

Upon reaction injection molding the resulting polyurethane polymer has a flexural modulus of ≧50,000 psi at 75° F., preferably >80,000 psi at 75° F., without exhibiting cold break. These flexural moduluses can be obtained without the addition of fillers or structural reinforcing agents. Gel times higher than 2 seconds and demolding times lower than 60 seconds are achieved and improve the processability latitude.

The process of forming polyurethane compositions according to the present invention is accomplished by conventional reaction injection molding techniques (RIM), or reinforced reaction injection molding (RRIM) or structural reaction injection molding (SRIM) techniques. The process also allows for spray molding. This includes both open and closed mold processes. This allows for a substitute spray molding composition which gives physical properties as good or better than conventional polyester resin fiberglass article, yet avoids the problem of volatile organic compounds. In addition, the composition can be applied using existing spray molding equipment.

The present invention also allows for the formation of a Structural Reaction Injection Molding (SRIM) molded article with an A class surface. This is achieved by RIM molding or spraying a surface layer of the polyurethane composition of the present invention on either or both surfaces of a mold to form the exterior surfaces, followed by forming an intermediate layer by conventional SRIM methods. The polyurethane surface layer may be filled or unfilled with conventional fillers and additives. Conventional SRIM articles often suffer the draw back of a surface layer which reveals the fiberglass structural reinforcement. By forming a surface layer of polyurethane, an A class surface can now be obtained in an SRIM article. The surface layer of polyurethane may be from 0.1–0.2" thick, preferably 0.125". It is preferable for the intermediate layer be of the same polymer composition as the surface layers to avoid delamination problems due to differences in the coefficient of thermal expansion.

The present process also allows for molded articles to contain suitable fillers and reinforcing material and the like, stabilizer, mold release agents and other additives known to those of ordinary skill in the art as commonly employed in the field of polyurethane molding compositions, especially RIM, RRIM and SRIM molding compositions.

As reinforcing materials are included but not limited to chopped or milled glass fibers, chopped or milled carbon fibers, or mineral fibers such as calcium silicate or wollastonite fibers or mica. Particularly suitable are fiberglass reinforcement fibers, particularly those having lengths of from about 1/16" to about 1/2".

Other features of the invention will become apparent in the course of the following descriptions of exemplary embodiments which are given for illustration of the invention and are not intended to be limiting thereof.

The physical properties of the polymers formed in the following examples were tested according to ASTM standards. Specifically Tensile Strength and % elongation were determined according to ASTM D638. Flexural Modulus was measured according to ASTM 790. Gardner Impact was measured according to ASTM D3029.

SYNTHESIS OF ISOCYANATE QUASI PRE-POLYMER

Example 1

A uretonimine modified MDI (Tedimon-316 from EniChem, a 29% by weight of free NCO) was reacted with a 4,800 molecular weight polyether triol (glycerine starter) containing, with random distribution, 70% by weight EO, 30% by weight PO (polyol TERCAPUR 1264 from New CarbochimEniChem) at 150° F. The material was dispensed into containers and checked for percent NCO, viscosity and reactivity.

Isocyanate quasi pre-polymers were made by this process with the following NCO percent:

TABLE 1

| % NCO | T-316/1264 |
|---|---|
| 14 | 1/1 |
| 17 | 1.5/1 |
| 19 | 2/1 |
| 21 | 3/1 |
| 23 | 4/1 |
| 24 | 5/1 |
| 25 | 6/1 |

Example 2 (Comparative)

TABLE 2

| | Reported in pbw | |
|---|---|---|
| Composition | 2a | 2b |
| Diethyl toluene diamine[1] (DETDA) | 25 | 25 |
| Polyol 5905[2] | 75 | 35 |
| Dibutyl tin dilaurate | 0.1 | 0.1 |
| Triethylene diamine (DABCO 33 LV) | 2.0 | 2.0 |

[1]ETHACURE 100 from the Ethyl Corporation
[2]a 6,000 $M_n$ polyether triol of Enichem.

The compositions 2a and 2b were each reacted with isocyanate quasi pre-polymer Tedimon 301 from Enichem, a 23% NCO prepolymer derived from MDI, at a 102 index to form polyurethane compositions. The polyurethane compositions were prepared under the following conditions:

Mold: 600×300 mm plate 3.1 mm thickness (weight 650–750 g)

Mold Temperature: 70° C.

Equipment: Gusmer high pressure machine model Delta Rim 120

Output: 900 g/sec

Raw Material Temperature: 35° C.

The reaction product of Tedimon 301 with composition 2a, at a polyol:DETDA ratio of 3:1, exhibited very short gel times on the order of 1.2 sec, good demolding times of about 45 sec, good heat sag properties, impact strength and green strength. However the flexural modulus was only 50,000 psi. No cold break was observed.

The reaction product of Tedimon 301 with composition 2b, at a polyol:DETDA ratio of 1.4:1, also exhibited very short gel times on the order of 1.2 sec, good demolding times of about 45 sec, good heat sag properties, impact strength and green strength. An increase in the flexural modulus was obtained to 85,000 psi, however, the material was very brittle and had very poor cold break properties. Thus with conventional quasi pre-polymer isocyanate components and diethyl toluene diamine, high flexural modulus (i.e >80,000 psi), without cold break could not be obtained.

Example 3 (Comparative)

TABLE 3

| Composition | Reported in pbw | |
|---|---|---|
| | 3a | 3b |
| Dimethylthio toluene diamine[3] (DMTTDA) | 25 | 25 |
| Polyol 5905[2] | 75 | 35 |
| Dibutyl tin dilaurate | 0.1 | 0.1 |
| Triethylene diamine (DABCO 33 LV) | 2.0 | 2.0 |

[2] a 6,000 $M_n$ polyether triol of Enichem.
[3] ETHACURE 300 from the Ethyl Corporation The compositions 3a and 3b were each reacted with isocyanate quasi pre-polymer Tedimon 301, a 23% NCO prepolymer derived from MDI, at a 102 index, to form polyurethane compositions under the same conditions as in Example 2.

The reaction product of Tedimon 301 with composition 3a, at a polyol:DMTTDA ratio of 3:1, exhibited a gel time of about 10 sec, demold times of about 90 sec, poor heat sag properties, good impact strength and poor green strength. However the flexural modulus was only 50,000 psi. No cold break was observed.

The reaction product of Tedimon 301 with composition 3b, at a polyol:DMTTDA ratio of 1.4:1, exhibited a gel time of about 10 sec, demold times of about 90 sec, poor heat sag properties, good impact strength and poor green strength. An increase in the flexural modulus was obtained to 81,000 psi, however, the material was very brittle and had very poor cold break properties. Thus with conventional quasi pre-polymer isocyanate components and dimethylthio toluene diamine, high flexural modulus (i.e. >80,000 psi), without cold break could not be obtained.

Example 4 ( Comparative )

TABLE 5

| Composition | 4 (pbw) |
|---|---|
| dimethylthio toluene diamine[3] | 25 |
| TEOA[4] | 5 |
| Polyol 5905[2] | 50 |
| Dibutyl tin dilaurate | 0.1 |
| Triethylene diamine (DABCO 33LV) | 2.0 |

[2] a 6,000 $M_n$ polyether triol of Enichem.
[3] ETHACURE 300 from the Ethyl Corporation
[4] a triethanolamine adduct with an OH # 650

The composition of Example 4 was reacted with a 21.5% NCO uretonimine isocyanate quasi prepolymer (derived from uretonimine modified MDI and a 4,000 $M_n$ polyether diol EO capped), at a 102 index, to form a polyurethane composition. The polyurethane composition was prepared as in Example 2.

TABLE 6

| Properties | Composition 4/21.5% NCO |
|---|---|
| Tensile strength | 5,800 psi |
| Flexural Modulus | >80,000 psi |
| Gardner Impact | 320 in-lbs. |
| % Elongation | 80% |

The above mentioned composition, exhibited a gel time of 8 sec and demolded at 90 sec. It shows a very rubbery feel, which later cured to a stiff article, fair heat sag properties, and a high flexural modulus of <80,000 without cold break. The drawbacks of this composition is the slow cure times and rubbery demold.

Example 5

TABLE 7

| Composition | Reported in pbw | |
|---|---|---|
| | 5a | 5b |
| Dimethylthio toluene diamine[3] | 25 | 25 |
| Polyol T-555[5] | 75 | — |
| Polyol T-844[6] | — | 75 |
| Dibutyl tin dilaurate | 0.1 | 0.1 |
| Triethylene diamine (DABCO 33LV) | 2.0 | 2.0 |

[3] ETHACURE 300 from the Ethyl Corporation
[5] a 4,800 $M_n$ EO capped polyether triol OH #35 from EniChem.
[6] a 4,800 $M_n$ EO capped polyether triol from EniChem The compositions 5a and 5b were each reacted with the isocyanate quasi pre-polymer according to Example I with an NCO content of 21% by weight at a 102 index to form polyurethane compositions under the conditions of Example 2.

The properties are listed below in Table 8.

TABLE 8

| Properties | Composition | |
|---|---|---|
| | 5a/21% NCO | 5b/21% NCO |
| Tensile strength | 3,500 psi | 3,500 psi |
| Flexural Modulus | 50,000 psi | 50,000 psi |
| Gardner Impact | 320 in-lbs. | 320 in-lbs |
| % Elongation | 200% | 200% |

Compositions 5a and 5b reacted with the 21% NCO isocyanate quasi pre-polymer molded with excellent results. The gel time was 8 sec and the demolding time lower than 45 sec. No rubbery feel and no cold break was observed.

The compositions 5a and 5b were each reacted with the isocyanate quasi pre-polymer according to Example 1 with an NCO content of 25% by weight at a 102 index to form polyurethane compositions under the conditions of Example 2.

The properties are listed below in Table 9.

TABLE 9

| Prop. | Comp. | |
|---|---|---|
| | 5a/25% NCO | 5b/25% NCO |
| Tensile strength | 3,500 psi | 3,500 psi |
| Flexural Modulus | 60,000 psi | 60,000 psi |
| Gardner Impact | 320 in-lbs | 320 in-lbs |
| % Elongation | 200% | 200% |

Compositions 5a and 5b reacted with the 25% NCO isocyanate quasi pre-polymer molded with excellent results. The gel time was 6 sec and the demolding time lower than 45 sec. No rubbery feel, increased flexural modulus and no cold break was observed.

Example 6

TABLE 10

| Composition | Reported in pbw | |
|---|---|---|
| | 6a | 6b |
| Dimethylthio toluene diamine[3] | 25 | 25 |
| Polyol T-555[5] | 50 | — |
| Polyol T-844[6] | — | 50 |
| Dibutyl tin dilaurate | 0.1 | 0.1 |
| Triethylene diamine (DABCO 33LV) | 2.0 | 2.0 |

[3] ETHACURE 300 from the Ethyl Corporation
[5] a 4,800 $M_n$ EO capped polyether triol OH #35 from EniChem.
[6] a 4,800 $M_n$ EO capped polyether triol from EniChem.

The compositions 6a and 6b were each reacted with the isocyanate quasi pre-polymer according to Example 1 with an NCO content of 21% by weight at a 102 index to form polyurethane compositions under the conditions of Example 2.

The properties are listed below in Table 11.

TABLE 11

| Prop. | Compos. | |
|---|---|---|
| | 6a/21% NCO | 6b/21% NCO |
| Tensile strength | 4,200 psi | 4,200 psi |
| Flexural Modulus | 80,000 psi | 80,000 psi |
| Gardner Impact | 320 in-lbs | 320 in-lbs |
| % Elongation | 150% | 150% |

The compositions 6a and 6b reacted with the 21% NCO isocyanate quasi pre-polymer molded with excellent results. The gel time was 6 sec and the demolding time lower than 40 sec. No rubbery feel, increased flexural modulus and no cold break was observed.

The compositions 6a and 6b were each reacted with the isocyanate quasi pre-polymer according to Example 1 with an NCO content of 25% by weight at a 102 index to form polyurethane compositions under the conditions of Example 2.

The properties are listed below in Table 12.

TABLE 12

| Proper. | Comp. | |
|---|---|---|
| | 6a/25% NCO | 6b/25% NCO |
| Tensile strength | 4,242 psi | 4,242 psi |
| Flexural Modulus | 88,000 psi | 88,000 psi |
| Gardner Impact | 320 in-lbs | 320 in-lbs |
| % Elongation | 150% | 150% |

Compositions 6a and 6b reacted with the 25% NCO isocyanate quasi pre-polymer molded with excellent results. The gel time was 6 sec and the demolding time lower than 40 sec. No rubbery feel, increased flexural modulus and no cold break was observed.

Obviously, numerous modifications and variations of the present invention are possible in light of the above teachings. It is therefore to be understood that within the scope of the appended claims, the invention may be practiced otherwise than as specifically described herein.

What is claimed is:

1. A reaction injection molding process comprising reacting:

A) an isocyanate quasi pre-polymer component comprising the reaction product of:
  i) a uretonimine modified MDI having a free isocyanate content of from 20–30% by weight NCO; and
  ii) a polyether triol component obtained from the reaction of a triol starter with a mixture of ethylene oxide and propylene oxide, containing 10–85% by weight of ethylene oxide and having a number average molecular weight of from 400–6,000;
wherein said isocyanate quasi pre-polymer has a free isocyanate content of from 10–27% by weight NCO; and B) a polyol component comprising:
  i) 25–250 pbw of a polyether polyol component of functionality 2–3 based on ethylene oxide units and propylene oxide units and a number average molecular weight of 400–6,000 wherein the ethylene oxide content is less than about 30 wt % based on the weight of said polyether polyol;
  ii) 25 pbw of an aromatic diamine; and
  iii) 0–250 pbw of an aminic polyol;
  iv) 0.01–0.5 pbw of an organometallic urethane forming catalyst; and
  v) 0–5.0 pbw of an amine urethane forming catalyst,
wherein the isocyanate-index of the reaction mixture is about 102 or greater.

2. The process of claim 1, wherein said polyether triol component is a random propylene oxide/ethylene oxide copolymer with a number average molecular weight of 400–6,000.

3. The process of claim 1, wherein said polyether triol is propylene oxide extended and is ethylene oxide capped with a number average molecular weight of 2,000–6,000.

4. The process of claim 1, wherein said polyether triol has a random propylene oxide/ethylene oxide distribution and is ethylene oxide capped with a number average molecular weight of 2,000–6,000.

5. The process of claim 1, wherein said process is reinforced reaction injection molding.

6. The process of claim 1, wherein said process is structural reaction injection molding.

7. The process of claim 1, wherein said process is spray molding.

8. The reaction injection molding process of claim 1, wherein said polyether triol component contains 65–85% by weight of ethylene oxide.

9. The reaction injection molding process of claim 1, wherein said polyether triol component is a random heteropolymer of polyethylene oxide and propylene oxide units.

10. A composition for a reaction injection molding process comprising:

A) an isocyanate quasi pre-polymer component comprising the reaction product of:
  i) a uretonimine modified MDI having a free isocyanate content of from 20–30% by weight NCO; and
  ii) a polyether triol component obtained from the reaction of a triol starter with a mixture of ethylene oxide and propylene oxide, containing 10–85% by weight of ethylene oxide and having a number average molecular weight of from 400–6,000;
wherein said isocyanate quasi pre-polymer has a free isocyanate content of from 10–27% by weight NCO; and B) a polyol component comprising:
  i) 25–250 pbw of a polyether polyol component of functionality 2–3 based on ethylene oxide units and propylene oxide units and a number average molecular weight of 400–6,000 wherein the ethylene oxide content is less than about 30 wt% based on the weight of said polyether polyol;
  ii) 25 pbw of an aromatic diamine; and
  iii) 0–250 pbw of an aminic polyol;
  iv) 0.01–0.5 pbw of an organometallic urethane forming catalyst; and
  v) 0–5.0 pbw of an amine urethane forming catalyst,
wherein the isocyanate-index of the reaction mixture is about 102 or greater.

11. A method of forming a polyurethane molded article comprising reaction injection molding the composition of claim 10.

12. The composition for a reaction injection molding process of claim 10, wherein said polyether triol component contains 65–85% by weight of ethylene oxide.

13. The composition for a reaction injection molding process of claim 10, wherein said polyether triol component is a random heteropolymer of polyethylene oxide and propylene oxide units.

14. A method of forming a reinforced polyurethane molded article with an A class surface comprising;
  i) forming a first layer of the composition of claim 8 onto either or both surfaces of a mold surface; followed by
  ii) forming an intermediate layer of the composition of claim 8 by structural reaction injection molding.

15. A molded article obtained by reaction injection molding of:

A) an isocyanate quasi pre-polymer component comprising the reaction product of:
  i) a uretonimine modified MDI having a free isocyanate content of from 20–30% by weight NCO; and
  ii) a polyether triol component obtained from the reaction of a triol starter with a mixture of ethylene oxide and propylene oxide, containing 10–85% by weight of ethylene oxide and having a number average molecular weight of from 400–6,000 wherein said isocyanate quasi pre-polymer has a free isocyanate content of from 10–27% by weight NCO; and B) a polyol component comprising:
  i) 25–250 pbw of a polyether polyol component of functionality 2–3 based on ethylene oxide units and propylene oxide units and a number average molecular weight of 400–6,000 wherein the ethylene oxide content is less than about 30 wt% based on the weight of said polyether polyol;
  ii) 25 pbw of an aromatic diamine; and
  iii) 0–250 pbw of an aminic polyol;
  iv) 0.01–0.5 pbw of an organometallic urethane forming catalyst; and
  v) 0–5.0 pbw of an amine urethane forming catalyst,
wherein the isocyanate index of the reaction mixture is about 102 or greater.

16. The molded article obtained by reaction injection molding of claim 15, wherein said polyether triol component contains 65–85% by weight of ethylene oxide.

17. The molded article obtained by reaction injection molding of claim 10, wherein said polyether triol component is a random heteropolymer of polyethylene oxide and propylene oxide units.

* * * * *